United States Patent [19]

Nelson

[11] 4,055,796
[45] Oct. 25, 1977

[54] CABLE SUPPORT AND LOCATOR STRUCTURE

[76] Inventor: Richard Allen Nelson, 23 Stonegate Road, LaGrange Park, Ill. 60525

[21] Appl. No.: 739,619

[22] Filed: Nov. 8, 1976

Related U.S. Application Data

[63] Continuation-in-part of Ser. No. 658,457, Feb. 17, 1976, abandoned.

[51] Int. Cl.² .................... G01V 3/08; G01R 31/08
[52] U.S. Cl. ........................................ 324/3; 324/67
[58] Field of Search .................... 324/3, 41, 67; 340/258 C, 258 D, 282

[56] References Cited

U.S. PATENT DOCUMENTS

| | | | |
|---|---|---|---|
| 2,438,197 | 3/1948 | Wheeler | 324/3 |
| 3,534,358 | 10/1970 | Stern | 324/41 X |
| 3,651,506 | 3/1972 | Olaf et al. | 340/258 C X |
| 3,665,511 | 5/1972 | Wolf | 340/258 D |
| 3,711,848 | 1/1973 | Martens | 340/258 C X |
| 3,740,742 | 6/1973 | Thompson et al. | 340/258 C X |
| 3,836,842 | 9/1974 | Zimmermann et al. | 324/3 X |

FOREIGN PATENT DOCUMENTS 2,404 of 6/1894 United Kingdom ............... 324/67

OTHER PUBLICATIONS

Lougheed et al., Buried Marking of Point Locations *IEEE Transactions on Instrumentation and Measurement*, vol. IM-22, No. 4, pp. 399-402, Dec. 1973.

*Primary Examiner*—Gerard R. Strecker
*Attorney, Agent, or Firm*—Dominik, Knechtel, Godula & Demeur

[57] ABSTRACT

There is disclosed a combined support and locator for underground fixtures intended to be buried, the support and locator being designed for use in conjunction with a metal detector which includes a support base formed of a moldable material, metallic means embedded within the support base and having an elliptical configuration, the support base and metallic means being formed as an integral unit, such that underground fixtures supported upon the support and locator may be re-located by the use of a metal detector, the metallic means reacting with the motive forces of the metal detector to effect locating of the underground fixture.

8 Claims, 6 Drawing Figures

CABLE SUPPORT AND LOCATOR STRUCTURE

CROSS-REFERENCE TO RELATED APPLICATION

This application is a continuation-in-part of application Ser. No. 658,457 entitled CABLE SUPPORT AND LOCATOR STRUCTURE filed Feb. 17, 1976 in the name of RICHARD ALLEN NELSON, as inventor.

BACKGROUND OF THE INVENTION

It is quite common in the construction and utility industry to bury a variety of utility cables and lines underground during the construction phases of buildings, highways, and/or other structures. The various types and forms of new materials now permit the positioning of cables such as electrical cables, telephone cables and the like to be buried under the ground without the fear of deterioration from the elements. Hence, the linear volume of underground cables has increased dramatically over the last several years.

One of the problems incident to the positioning of electrical, telephone, and other such cables underground is the fact that often, repairs are necessary. Repairs may be necessitated due to the accidental severing of the cable during the construction phase of a given project, or alternatively, in some instances, a deterioration of the outer casing of the cable has been found to occur in which case, the damaged portion of the cable must be located and repaired. It will be appreciated that in order to find the damaged portion of any given utility cable underground in the first instance, it is usually necessary to do an extensive amount of excavating in order to unearth the cable. Once the damaged portion of the cable has been located, and the repairs have been effected, it is then customary to simply bury, once again, the cable such that above-ground structures may be re-layed. It will be appreciated, however, that often times, the repaired section of the cable will require subsequent repairs for the reason that when splices or other repairs are effected, the repaired portion of the cable is protected with, at best, a temporary casing such as tape or some other such material. Hence, the probability of further damage such as by the elements, or the like increases with respect to such repaired sections of the cable. It has therefore become necessary in the industry to mark such damaged and repaired sections of the cable with some form of locating means such that should additional repairs be necessitated, extensive excavating will not be necessitated a second time, but rather, a detector may be employed to re-locate the spliced or repaired section of the cable for subsequent repairs.

The most common procedure which has been adopted by the utility company is to support the spliced or repaired section of the cable on a wood plank to which a metallic object is attached such as by nailing or bolting the same to the plank. A metal detector may then be employed to locate the metallic element affixed to the wooden plank. Presently, this system is utilized especially in cases where a utility cable must be repaired by splicing and repairing and then re-taped. However, it has been found that wooden planks, even when creosolled, tend to deteriorate when positioned under the ground and in addition, any metallic rod or cable attached to the plank has been found to similarly deteriorate with time. Hence, subsequent re-location of the damaged or spliced section has been rendered difficult.

OBJECTS AND ADVANTAGES

The object of the present invention is to provide an improved support and locator device for supporting underground fixtures such as cables or the like, and permitting ease of re-locating the same while at the same time, eliminating the possibility of deterioration of the support and locator due to the action of the elements contained underground.

A further object of the invention is to provide a support and locator device for underground fixtures which includes a support base formed from a moldable plastic material and includes a metallic element embedded within the moldable plastic material, the support base and metallic element being formed as an integral unit which thereby permits the repaired portion of the cable to be supported on top of the support base, and the support base being retrievable by means of the use of a metal detector which will detect the metallic element embedded within the support base in order to permit ease of re-location and subsequent repair to the cable or other underground fixtures supported thereon.

In connection with the foregoing object, it is yet a further object of this invention to provide a support and locator of the type described wherein the metallic element consists of a steel rod which is elliptical in configuration and is embedded within the support base during the manufacturing operation such that support base and the ellipitical steel rod are formed as an integral unit while at the same time insuring that the steel rod is removed from contact with the underground elements to prevent any deterioration thereof over extended periods of time.

In connection with the foregoing object, it is yet another object of the invention to provide a support and locator of the type described wherein the elliptical steel rod is spaced inwardly from the outer exposed surfaces of the support base and basically centrally positioned with regard to the interior confines of the support base.

Still another object of the invention is to provide a support and locator device of the type described above, wherein the elliptical steel rod further includes an extension portion which extends laterally outwardly toward a side edge of the support and includes an exposed lateral section of the steel rod which is adapted for interconnection with the cable fixture to be supported on the support for the purpose of grounding the same in order to permit various forms of metal detectors to be utilized to locate the subject support and a locator assembly.

Further features of the invention pertain to the particular arrangement of the elements and parts whereby the above-outlined and additonal operating features thereof are attained.

The invention both as to its organization and method of operation, together with further objects and advantages thereof, will best be understood by reference to the following specification, taken in conjunction with the accompanying drawings.

SUMMARY OF THE INVENTION

Briefly, the present invention is intended to provide an improved support and locator for supporting underground fixtures such as cables and the like which eliminate any material which is decomposable when buried underground, and which removes the metallic element associated with the support from contact with the elements. The invention is directed to a support base formed of a moldable plastic material in which a steel rod is embedded during the manufacturing operation thereby to provide an integral unit for use as a support and locator for underground fixtures.

DETAILED DESCRIPTION OF INVENTION

Figure 1:
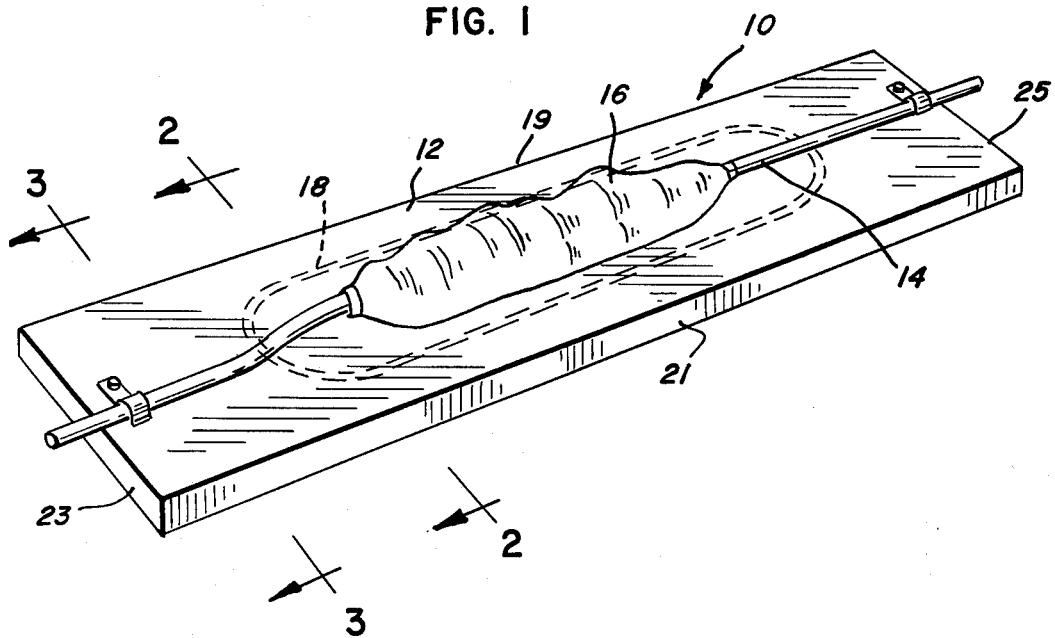
FIG. 1 is a perspective view showing the subject support and locator of the present invention and depicting a spliced portion of the cable supported thereon.
Figure 2:
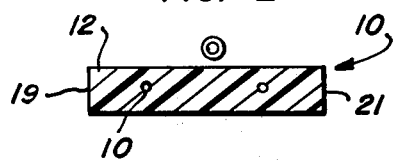
FIG. 2 is a side elevational view, in cross section, showing the construction of the support base and metallic element located therein, taken in the direction of the arrows along the line 2—2 of FIG. 1.
Figure 3:
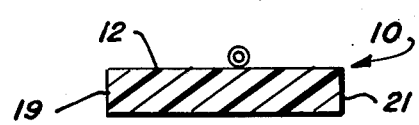
FIG. 3 is a side elevational view, in cross section, showing a different section of the support base thereby to indicate the positioning of the metallic element relative to the outer extremities of the support base, taken in the direction of the arrows along the line 3—3 of FIG. 1.

With reference to the drawings, the support and locator, generally referred to by the numeral 10, is illustrated. The support and locator 10 is formed by a support base 12 which is shown to be generally rectangular in cross-section and having a length substantially greater than the width dimension thereof. As shown in FIGS. 1 through 3 of the drawings, a cable 14 is shown to be supported on the top surface of the support base 12, the cable including a spliced and repaired section 16 thereby illustrating the general manner in which a typical utility cable would be spliced, repaired and re-taped.

Figure 4:
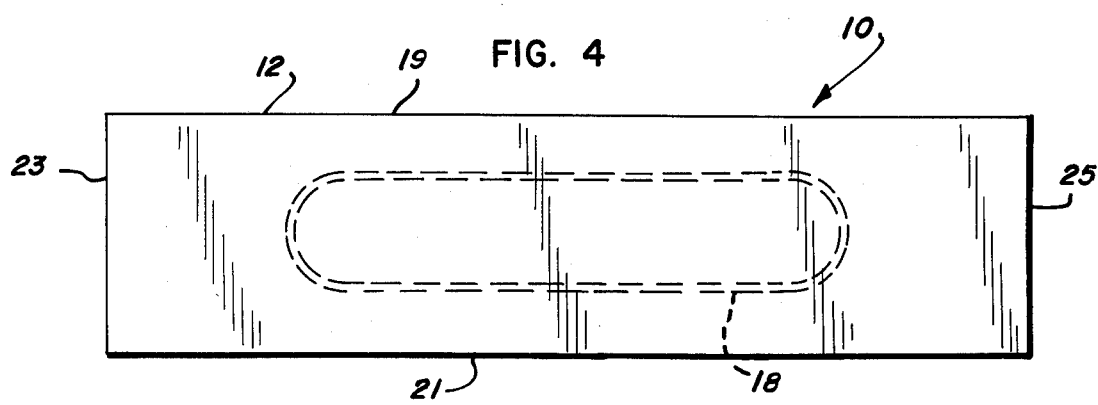
FIG. 4 is a top view, partly in cross section, showing the spacial and structural relationship between the support base and the metallic element located and embedded therein.

A metallic element, generally referred to by the numeral 18 is shown to be embedded within the support base 12, the metallic element 18 in the preferred embodiment assuming an elliptical configuration as more specifically shown in FIG. 4 of the drawings. It will further be noted that the positioning of the metallic element 18 within the support base 12 is such that the metallic element 18 is basically centrally positioned, and spaced inwardly from the exposed side edges 19 and 21 as well as from the exposed end edges 23 and 25, respectively. It will therefore be appreciated that the metallic element 18 is totally removed from exposure from any of the underground elements and therefore the possibility of deterioration of the steel rod is minimized if not eliminated.

Furthermore, by employing an elliptical configuration for the steel rod forming the metallic element 18, the positive reaction to the frequency output of a metal detector is insured. In most installations, the cable 14 supported on the support base 12 will be positioned internally of the confines of the elliptical configuration of the metallic element 18, although it is insignificant if the cable 14 is positioned such that same lies over the metallic element 18.

It is also within the scope of the present invention that the steel rod forming the metallic element 18 is corrosion proof, to insure that any moisture which may seep through the plastic support base 12 will not corrode or degrade the metallic element 18.

Insofar as the construction of the support base 12 is concerned, it is considered to be the preferred embodiment of the invention to form the support base 12 from a plastic material such as a polyurethane foam. In this manner, the strength and density of the support base 12 may be controlled during the manufacturing operation since any level of strength and density may be obtained by adjusting the parameters of the manufacturing procedure. In addition, it is found that the embedding of the metallic element 18 within the polyurethane foam material is a fairly simple procedure such that overall economics to the manufacturing of the unit are minimal.

In terms of the overall dimensions of a typical support and locator 10, it is contemplated that the support base 12 would have a thickness of approximately 2 inches, and a width of approximately 10 inches. The length may be varied by providing a support base 12 of varying such as 2 foot lengths, 3 foot lengths, 4 foot lengths, up to 8 foot lengths. It has been found that in most installations, the underground fixture to be suppported on the support base 12 will generally not exceed 10 inches in width, and usually the repaired or spliced section of the cable will not exceed 8 feet in overall length. Hence, by providing a support and locator 10 as a manufactured item in various lengths, virtually every type of repair or splice operation incident to underground cables can be accommodated.

As was indicated above, the advantage to forming the support base 12 from a moldable material is the fact that the density and strength factor of the support and locator 10 may be carefully controlled. This obviously has an advantage in terms of preventing the deterioration or corrosion of the inner metallic element 18 since the support base 12 may be made sufficiently dense such that only a minimal amount of moisture can possibly enter the inner portions of the support base 12 thereby to corrode or deteriorate the metallic element 18. In addition, it has been found that insofar as the strength factor is concerned, a polyurethane foam support plank of the type described herein may be made to have the strength characteristics of a wooden oak plank. On the other hand, the economics are such that a support and locator 10 of the type described herein may be made very economically on a mass production basis such that the overall cost is less than cresolled wood.

It will further be appreciated that the subject support and locator 10 of the present invention clearly obviates the need for any other forms of markers to mark and locate the positioning underground of a spliced or repaired section of any utility cable. In addition to the present types of locating devices, it is also common to employ above-ground markers for the utility crews to locate previously repaired sections of the cable. It will therefore be appreciated that all that would be necessary to subsequently locate any spliced sections of cable resting on the support base 12 of the support and locator 10 of the present invention, would be a metal detector 10 of the type commonly in use at the present time.

Figure 5:
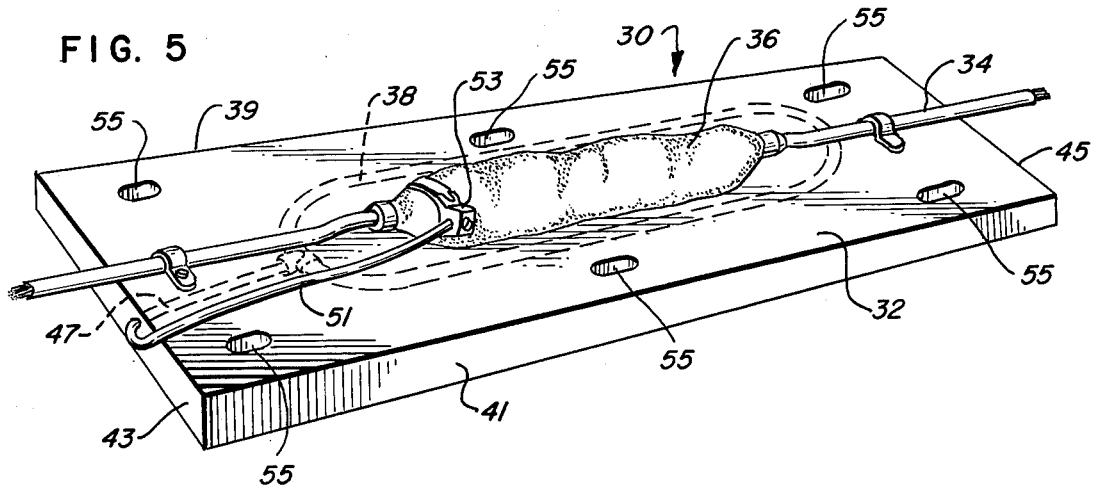
FIG. 5 is a perspective view showing an alternate embodiment of the subject support and locator which further includes a laterally extending metallic element which terminates in an outwardly exposed and laterally extending ground section for interconnection to the table fixture supported thereon.
Figure 6:
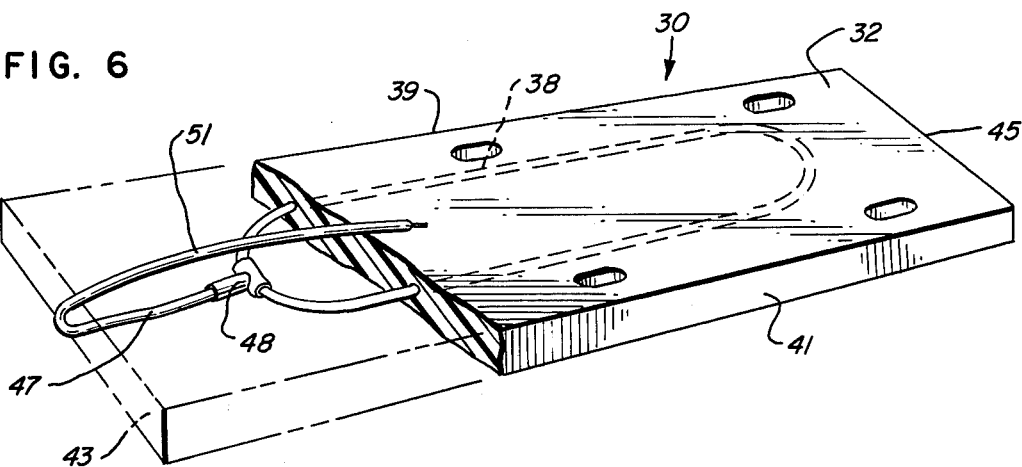
FIG. 6 is a perspective view, partly in cross-section, showing the manner in which the laterally extending metallic rod connects to the metallic element and terminates in a outward lateral ground portion suitable for attachment to the supported cable fixture.

With respect to FIGS. 5 and 6 of the drawings, an additional alternate embodiment of the invention is illustrated. There is shown a support and locator generally referred to by the numeral 30 which is formed by support base 32. Once again, the support base 32 is shown to be generally rectangular in cross-section having a length substantially greater than the width dimension thereof. A cable 34 is shown to be supported on the top surface of the support base 32, the cable 34 including a spliced and repaired section 36, in the same manner as was illustrated in connection with FIG. 1 of the drawings.

A metallic element referred to by the numeral 38 is embedded within the support base 32 and is shown to similarly assume an elliptical configuration as was true in connection with the metallic element 18 referred to in FIGS. 1 through 4 of the drawings. Once again, the metallic element 38 is centrally positioned, and spaced inwardly from the exposed side edges 39 and 41 as well as from the exposed end edges 43 and 45 respectively. The metallic element 38 is shown to further include a lateral extension portion 47 which extends laterally outwardly through one of the end edges of 43 thereof. The lateral extension portion 47 is similarly embedded within the confines of the support base 32 and may either be formed as a separate metallic portion connected to the metallic element 38, such as by a connector member 48, or the lateral extension portion 47 may actually be formed integrally within metallic element 38 and simply extend laterally outwardly therefrom. As shown in both FIGS. 5 and 6 of the drawings, the lateral extension portion 47 includes an outwardly projecting ground portion 51 which actually forms a section of the lateral extension portion 47 external of the support base 32.

As shown in FIG. 5 of the drawings, it is intended that the outward ground 51 of the metallic element 38 is actually grounded to the cable fixture 34 by means of a ground connector 53. In this manner, the metallic element 38 is actually grounded with respect to cable fixture 34. The principal purpose for providing the alternate embodiment of a cable support and locator 30 of the type shown in FIGS. 5 and 6 of the drawings, is to permit the use of diverse forms of metal detectors in the field. For example, two different versions of metal detectors operate on the theory of tone generation by detecting the tone generated in the cable underground. The detector is placed at an access point and detects the tone generated along the length of the underground cable. The operator would simply follow the tone as amplified in the detector until the tone diminishes and in effect stops. The ground portion of the wire 51 operates as a resistance to the continued generation of the tone and will therefore cause a decrease or ceasing of the tone as determined by the detector. The operator would then know that at the point the tone ceases or diminishes, that the operator is above the area of the spliced section of the cable sitting on the locator board 30. Exemplary of the type of equipment referred to herein is the metal detector made by the Hewlett Packard Company, Model No. 4904, which is a tone-generated detector. Additionally, a detector made by Dynatel Company, Model No. 500 similarly operates on the same principle. In both of these instances, the detectors are intended to detect the tone generated along the length of the cable and the tone will diminish drastically or even stop at the point where the ground portion is interconnected with the cable sheath.

It will also be observed in FIG. 5 of the drawings that the support and locator base 32 is further provided with a series of six tie slots 55, located in pairs of two along the length of the board. The tie slots 55 extend through the entire thickness of the board base 32 and are constructed to accommodate tie straps (not shown) which can be positioned to circumscribe a cable or other fixture positioned on the board 30. The tie straps simply assure that the underground fixture remains securely positioned on the support and locator 30 when buried under ground.

Insofar as the embodiments of the invention illustrated in FIGS. 1 through 6 of the drawings are concerned, the metallic elements depicted therein, Nos. 18 and 38, are intended to be formed of either No. 6 or No. 10 gauge copper wire, with the outward ground portion 51 shown in the embodiments of FIGS. 5 and 6 of the drawings further including a weather-proof plastic sheath in order to protect the exposed section of the wire from the elements.

It will be appreciated from the above description that the present invention provides an economically simplified and structurally convenient support and locator for supporting and permitting the subsequent re-location of underground fixtures such as cables or the like, while at the same time eliminating difficulties inherent in buried underground structures. In this connection, problems incident to deterioration or degradation of materials buried underground has been minimized if not eliminated such that the support and locator of the present invention will have a long useful life. In addition, the manner in which the subject support and locator 10 of the present invention is constructed is such that the overall unit will have great strength, great resistance to deterioration, while at the same time insuring that positive reaction will be set up between the locator and a metal detector employed to re-locate the fixture positioned atop the support.

While there has been described what is at present considered to be the preferred embodiments of the invention, it will be understood that various modifications may be made therein, and it is intended to govern in the appended claims all such modifications as fall within the true spirit and scope of the invention. To this end, it will be apparent that a variety of plastic materials may be employed for the construction of the support base, and similarly, metallic elements other than steel rods may similarly be employed so long as the same positively react with a metal detector. It is intended to cover in the appended claims all such obvious modifications of the invention of the type mentioned hereinabove.

What is claimed is:

1. A combined support and locator for underground fixtures for use in conjunction with a metal detector of the type creating an electrical field, comprising in combination, a support base for supporting an underground fixture thereon, said support base formed of a moldable material, metallic means embedded within said support base, said metallic means having sufficient mass and density such as to respond to the field created by the metal detector, said base and metallic means being formed as an integral unit, said metallic means further including a lateral extension portion extending laterally outwardly from said metallic means being similarly embedded within said support base and projecting outwardly from the confines of said support base for a distance, said lateral extension portion being adapted for interconnection with the cable fixture supported on the support base for the purpose of grounding the same in order to permit various forms of metal detectors to be utilized to locate the subject support and locator assembly, with the cable fixture supported thereon, whereby an underground fixture may be supported on said support base and buried, may be re-located by the use of a metal detector of the type creating an electrical field which upon contsct with the embedded metallic means will generate a signal to indicate the presence of the support and locator and fixture located thereupon.

2. The support and locator as set forth in claim 1 above, wherein said metallic means comprises a steel rod.

3. The support and locator as set forth in claim 2 above, wherein said steel rod is ellipitcal in configuration and positioned centrally within said support base.

4. The support and locator as set forth in claim 3 above, wherein said support base is rectangular in cross section.

5. The support and locator as set forth in claim 4 above, wherein said elliptical steel rod is spaced inwardly from the exposed external surfaces of said support base and positioned substantially centrally within said support base.

6. The support and locator as set forth in claim 1 above wherein said support base is formed of a polyfoam plastic material.

7. The support and locator as set forth in claim 1 above, wherein said support base is rectangular in cross section, and said lateral extension portion extends outwardly from one of the side edges of said support base, and said lateral extension portion being sufficiently flexible to permit dependable movement thereof in order to permit the interconnection thereof with the underground cable fixture supported on said support base.

8. The support and locator as set forth in claim 1 above, wherein said metallic means and lateral extension portion thereof are formed of copper wire no more then No. 10 gauge.

* * * * *